(12) United States Patent
Randall et al.

(10) Patent No.: US 9,423,964 B1
(45) Date of Patent: *Aug. 23, 2016

(54) DATA TRANSFORMATION DURING RECYCLING

(71) Applicant: NETAPP, INC., Sunnyvale, CA (US)

(72) Inventors: Charles Randall, Boulder, CO (US); David D. Wright, Boulder, CO (US); Michael Xu, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,938

(22) Filed: Nov. 16, 2015

Related U.S. Application Data

(63) Continuation of application No. 14/932,063, filed on Nov. 4, 2015.

(51) Int. Cl.
| G06F 12/00 | (2006.01) |
| G06F 13/00 | (2006.01) |
| G06F 3/06  | (2006.01) |

(52) U.S. Cl.
CPC .............. *G06F 3/0608* (2013.01); *G06F 3/064* (2013.01); *G06F 3/0673* (2013.01)

(58) Field of Classification Search
None
See application file for complete search history.

(56) References Cited

U.S. PATENT DOCUMENTS

| 6,604,155 B1 | 8/2003 | Chong, Jr. | |
| 2003/0028642 A1 | 2/2003 | Agarwal et al. | |
| 2004/0107281 A1 | 6/2004 | Bose et al. | |
| 2004/0133622 A1 | 7/2004 | Clubb et al. | |
| 2005/0246362 A1* | 11/2005 | Borland | G06F 17/30067 |
| 2006/0232826 A1* | 10/2006 | Bar-El | G06F 21/6218 358/403 |
| 2008/0244158 A1* | 10/2008 | Funatsu | G06F 12/0804 711/100 |
| 2011/0238857 A1 | 9/2011 | Certain et al. | |
| 2013/0060992 A1* | 3/2013 | Cho | G06F 12/0246 711/103 |
| 2013/0166861 A1* | 6/2013 | Takano | G06F 3/0608 711/161 |
| 2014/0013068 A1* | 1/2014 | Yamato | G06F 3/0608 711/154 |
| 2014/0215170 A1* | 7/2014 | Scarpino | G06F 3/0608 711/161 |
| 2014/0244962 A1* | 8/2014 | Arges | G06F 12/023 711/171 |
| 2015/0106556 A1* | 4/2015 | Yu | G06F 3/0608 711/103 |
| 2015/0378613 A1* | 12/2015 | Koseki | G06F 3/0608 711/103 |

OTHER PUBLICATIONS

Non-Final Office Action received for U.S. Appl. No. 14/932,063 mailed Jan. 26, 2016, 9 pages.
Notice of Allowance in U.S. Appl. No. 14/932063 mailed May 4, 2016 (7 pages).

* cited by examiner

*Primary Examiner* — Sean D Rossiter
(74) *Attorney, Agent, or Firm* — Foley & Lardner LLP

(57) ABSTRACT

Disclosed are systems, computer-readable mediums, and methods for transforming data in a file system. As part of a recycling process, a determination is made that transformations should be attempted. A data block is determined to be in use by at least one user of the storage system. If a transformation should be attempted on the data block is determined. Parameters associated with the performance of the file system can be used in this determination. A type of transformation to be done is determined. The data block is transformed based upon the selected transformation. The transformed data block is written to the storage system. As part of the recycling process, the transformation requires no additional input/output requests.

20 Claims, 5 Drawing Sheets

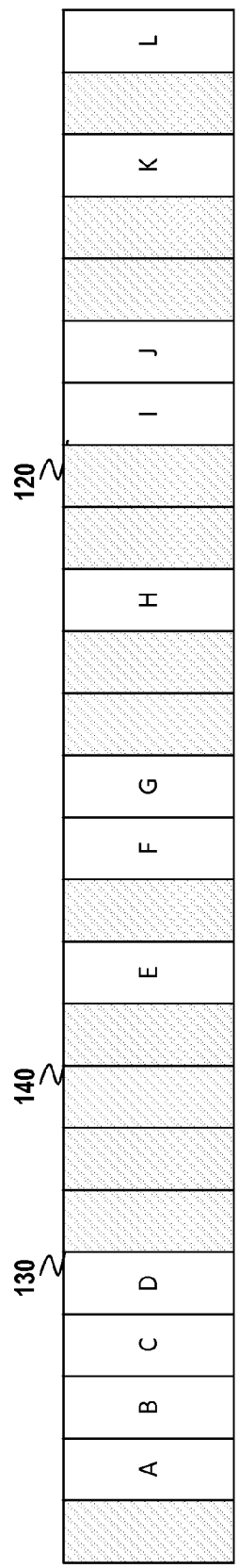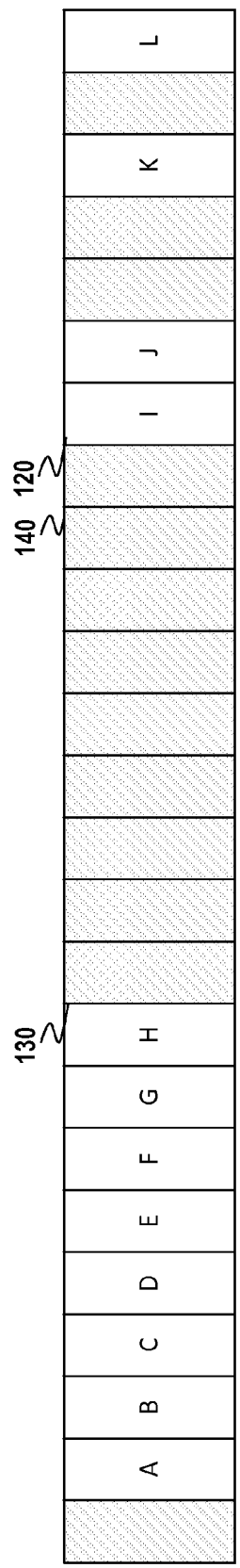
FIG. 2A
FIG. 2B

DATA TRANSFORMATION DURING RECYCLING

CROSS-REFERENCE TO RELATED APPLICATIONS

This application is a continuation of U.S. Non-Provisional application Ser. No. 14/932,063, filed Nov. 4, 2015, the contents of which are incorporated by reference in its entirety into the present disclosure.

BACKGROUND

The following description is provided to assist the understanding of the reader. None of the information provided is admitted to be prior art.

Log-structured file systems were created to increase write throughput, especially for small random writes. To reduce disk access times, data writes are done sequentially. Data writes can also be queued together, such that multiple data blocks are written sequentially during a single write. As data is written sequentially, overwriting existing data results in both the new data and the old data being stored. To reclaim additional storage space, unused data blocks can be reclaimed through recycling or a combination of recycling and garbage collection.

BRIEF DESCRIPTION OF THE DRAWINGS

The foregoing and other features of the present disclosure will become more fully apparent from the following description and appended claims, taken in conjunction with the accompanying drawings.

FIG. 2A illustrates a log-structured file system with stored data in accordance with an illustrative implementation.

FIG. 2B illustrates the results of a recycling process in accordance with an illustrative implementation.

DETAILED DESCRIPTION

Overview

Figure 1:
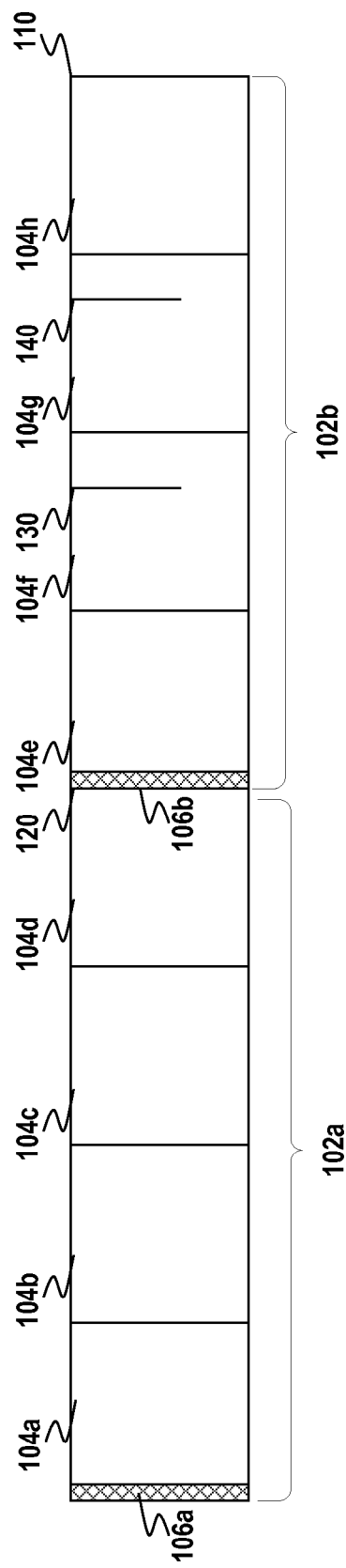
FIG. 1 depicts storage used in a log-structured file system in accordance with an illustrative implementation.

In general, one innovative aspect of the subject matter described below can be embodied in methods for transformation of data blocks stored in a storage system, using one or more electronic processors. A determination is made that transformations should be attempted. A data block is determined to be in use by at least one user of the storage system. Determine that a transformation should be attempted on the data block. A transformation of the data block is determined. The data block is transformed based upon the selected transformation. Write the transformed data block to the storage system. Other implementations of this aspect include corresponding systems, apparatuses, and computer-readable media, configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

Described herein are techniques for a file system that includes the ability to transform data already stored in the log-structured file system during normal operation of the log structured file system. For example, during recycling, in a log-structured file system, stored data that is being moved can be transformed. Data can be compressed, decompressed, encrypted, decrypted, format changed, etc. Data can also be recompressed. For example, data can be stored in a compressed format using a particular compression algorithm. During recompression, the data can be uncompressed and compressed using a different algorithm. Recompression can be used when as part of the initial writing of data uses a fast compression algorithm. During recompression, the data can be compressed with a slower algorithm that likely compresses the data more than the initial algorithm. As the transformation occurs during the normal operation of the log-structured file system, no additional I/O operations are incurred. Thus, the transformations can be done efficiently compared to other methods of transformation that incur I/O requests specifically as part of the transformation process. For example, recompressing, compression of, or encryption of all stored data independent of a process such as recycling would incur both read and write I/O requests when the data is read and then written back to storage. The current inventions described below do not require any additional I/O requests compared to the normal operation of the log-structured file system. Further, the transformation can allow a storage system to run more efficiently. For example, data can initially be written without any compression. This allows the data to be written to storage faster as no time is spent compressing the data prior to the data write. During normal operation of the file system, the data can be compressed and stored. The end user will not notice this compression and storage since it is part of the file system and the user would not be currently writing the data that is being compressed. Thus, the file system has the benefit of compressed data but with no delays during the initial write. The end user, therefore, sees faster data writes but also eventually gets the benefit of compressed data. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

FIG. 1 depicts storage 110 used in a log-structured file system in accordance with an illustrative implementation. In one implementation, the storage 110 is a single solid state drive. The storage 110 is broken down into multiple regions or segment files, 102a and 102b. The size of the regions can be identical for the storage. The number of regions can be configured when the storage is initially configured or reconfigured at a later time. As an example, 1 terabyte (TB) storage can include ten 102.4 gigabyte regions. Alternatively, the same 1 TB storage could be broken into forty 250 megabyte regions. In other implementations, the regions can be of varying sizes.

Each region is further divided into segments, 104a-104h. Data is written into the appropriate segment when data is flushed to storage. To determine where to write data, a write pointer 130 is used. The write pointer points to the next position of the storage 110 that will be written to. A corresponding read pointer 120 is also used. The read pointer points to the where the data starts in the storage 110. Because data is written in a sequential manner consecutively through the storage 110, the start of the stored data can be anywhere within the storage. Both the read pointer and the write pointer are used during garbage collection or recycling that recaptures storage space of deleted data.

In various implementations, data is not shared across end users. That is, data belongs to a single end user, such that when the end user deletes data no other end user is currently using that data. In other implementations, data is shared across end users. In these implementations, when two users write the same block of data, the data is deduplicated such that only one block of data is written to storage.

Each region can include a checkpoint, 106a and 106b, and a header (not shown). The header can include a sequence number that can be used to determine the last segment file that the file system wrote to the storage system. This can be used during start-up of the file system. The checkpoint has a list of user files and metadata associated with the user files. Metadata for example can include data such as the filename, created time, last accessed time, last written time, size, etc. In addition, each file has a list of branches. Initially, a file has only a single branch. As the file is manipulated, one or more branches can be created.

To decrease write amplification, e.g., the actual amount of data written when data is written, a pointer structure can be used to identify the data contents of the file. Write amplification can be an issue when a system must write data, such as metadata, in addition to the actual data being written. For example, if 4 kilobytes (KB) of data is to be written, but to do so the file system requires 8 KB of metadata to be written, each write costs 3× the amount of data being written. Any file system has some overhead as some metadata must be written to keep track of the file contents and related data.

As described above, the described log-structured file system writes data continuously from the beginning of storage to the end of the storage. As data is deleted, the data is not erased from storage. Rather, an indication that the data has been deleted is written, but the actual data remains on the disk. Eventually, this deleted data must be recaptured so that additional data can be written to storage. This is accomplished with a process referred to as recycling. Recycling can occur at various times. As one example, recycling can occur at scheduled times. As another example, recycling can be done each time a segment is written, each time a new region is written to, or based upon the distance between the read pointer and the write pointer. In various implementations, the file system maintains a recycle pointer 140, as shown in FIG. 1.

The data starting the write pointer 130 up to the recycle pointer 140 is the amount of known free space that is available for writing new data. No user data is stored between the write pointer 130 and the recycle pointer 140. The rest of the data in the file system, e.g. from the recycle pointer 140 to the write pointer 130 includes data that may still be in use or may no longer be in use by any user of the storage system.

As noted above, when a user deletes data, metadata associated with the data can indicate that the data is no longer in use. This deleted data needs to be recaptured for writing. The distance between the write pointer 130 and the recycle pointer 140 indicates the known amount of free storage that can be written. Recycling can occur at various times. When the distance between the write pointer 130 and the recycle pointer 140 falls below a predetermined threshold, e.g., 100 MB, 250 MB, size of the segment file, 10% of the size of a region, etc., the recycling process can be triggered to reclaim deleted data. Other examples include, each time a segment is written, each time a new region is written to, or based upon the distance between the read pointer and the write pointer.

FIG. 2A illustrates a log-structured file system with stored data. Data blocks A-L each stores data that is being used by at least one user. Blocks 120 are data blocks that have been deleted such that no user is using the data stored in those data blocks. Recycling can begin once the distance between the write pointer 130 and the recycle pointer 140 is determined to be less than a predetermined distance. FIG. 2B illustrates the results of a recycling process. The recycling process starts at the recycling pointer 140 and reads a number of data blocks. The maximum number of data blocks that can be read are those up to the write pointer 130. For large amounts of storage, the number of blocks between the recycling pointer 140 and the write pointer 130 would require too much time for recycling to complete. Accordingly, for these systems some smaller number of data blocks is examined. Each data block is determined to be either in use or not in use by an end user.

In implementations where data is not shared between users, a simple deleted flag can be used to indicate that the end user has deleted a block of data. In other file systems, data blocks can be shared across multiple end users. In these file systems, one user deleting a data block no longer means that the data block is no longer in use, as another end user could still be using the data block. During recycling, metadata associated with the data block, e.g., a block identifier, can be used to determine if the data block is still in use by any end user. For example, the block identifier can be used to query a data structure that indicates if the data block is still being used If the data block is in use the data block is read and written at the write pointer 130. The write pointer 130 is then updated to point to the next data block. For example, in FIGS. 2A and 2B data blocks E, F, G, and H are in use. When block E is examined, the block is determined to be in use. The recycle process then reads block E and writes block E at the location of the write pointer 130. The write pointer 130 is then updated to point to the data block after block E. The recycle pointer 140 is also updated to point to the block after block D's original position. Before block E is written, block E can be transformed. For example, block E can be compressed, encrypted, etc. Specific examples are further detailed below. The recycle process reads and moves blocks F, G, and H accordingly as well. Any block that is not in use is simply ignored and the recycle pointer 140 is updated. After recycling, both the write pointer 130 and the recycle pointer 140 have been updated and the free space between these pointers has been increased. The increased space can be seen in FIG. 2B.

In some implementations, the operations to determine what data blocks are in use can be done independently of the recycling process. The operations that determine what data blocks are in use is referred to as garbage collection. Separating garbage collection from recycling is useful when the multiple users can share a data block and the operations used to determine if a data block is in use are more complicated than simply reading an in-use indicator. The garbage collection process analyzes data blocks, determines if they are in use, and then updates an in-use indicator accordingly. The recycling process, therefore, can be simplified in these embodiments simply to read the in-use indicator to determine if a data block needs to be removed and can be safely overwritten.

Figure 3A:
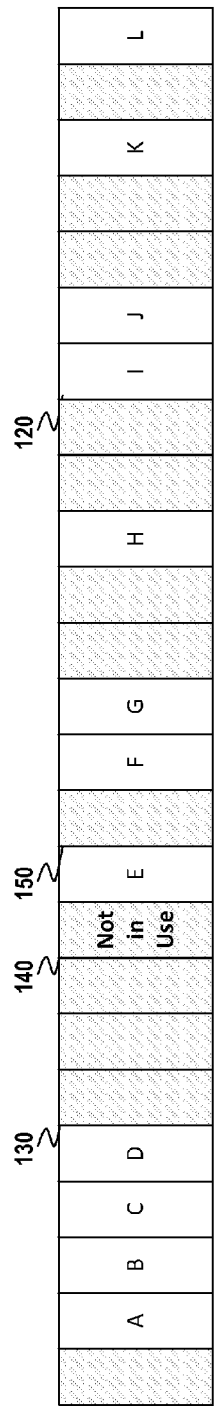
FIGS. 3A-3C illustrate using a garbage collection process in combination with a recycling process in accordance with an illustrated implementation.
Figure 3B:
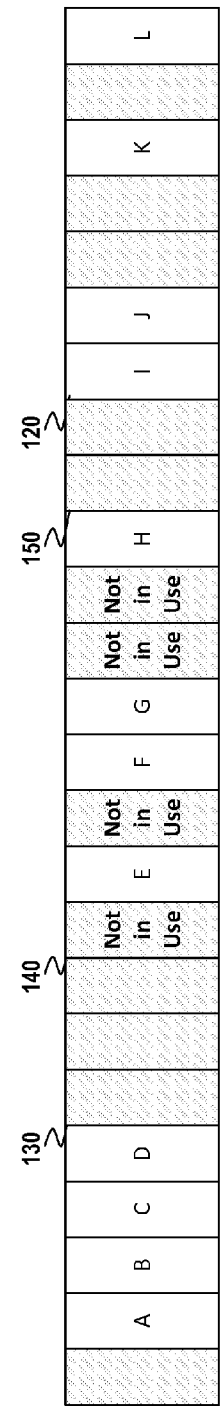
Figure 3C:
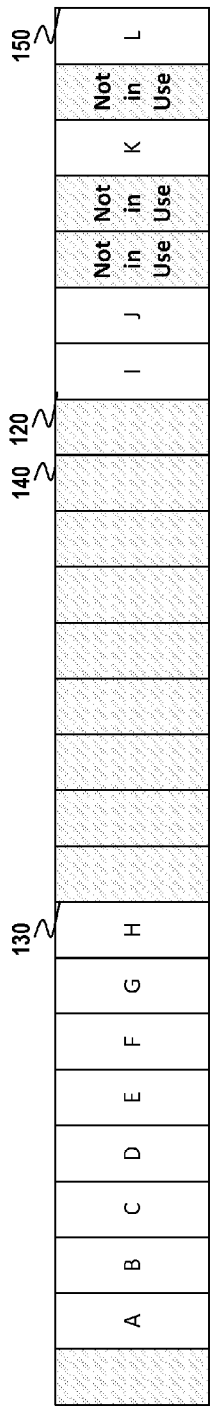

FIGS. 3A-3C illustrate using a garbage collection process in combination with a recycling process. A garbage collection pointer 150 is used to indicate that the blocks between the recycle pointer 140 and the garbage collection pointer 150 have been determined to be either in use or not in use. The garbage collection process can be triggered when the distance between the recycle pointer 140 and the garbage collection pointer 150 is below a predetermined threshold, e.g., 100 MB, 50% the size of a segment, 25% the size of a region, etc. FIG. 3A illustrates a file system prior to the garbage collection process being done, while FIG. 3B illustrates the results of the garbage collection process.

During garbage collection, a data block is examined to determine if it is in use. This can be done exactly as described above during the recycling process. Some indicator, such as a deleted or in-use indicator, can be updated accordingly. For example, in FIGS. 3A and 3B an in-use indicator is set based upon determining if a data block is being used by any user of the file system. Conversely, a deleted block identifier can be used to indicate that the data block is no longer in use. For example, when garbage collection begins, the number of blocks to examine can be determined. The number of blocks can be a predetermined number of blocks, a number of blocks in a region, a number of blocks in a segment, a number of blocks needed to increase the distance between the recycle pointer 140 and the garbage collection pointer 150 to a predetermined distance, etc. Each of these blocks can have a deleted indicator set to true. Then the garbage collection process can run through each data block that is currently stored on the storage device. For example, metadata representing the files, data, etc., stored on the storage can be traversed. For each block in the blocks being examined that is being used, the deleted indicator can be set to false. After traversing the metadata, any data block with its deleted indicator still set is known to be no longer in use and can be deleted. At the end of the garbage collection process, the garbage collection pointer 150 is updated accordingly, as shown in FIG. 3B. At a later time, the recycling process can begin. As the garbage collection process has already updated the in-use/deleted indicator, the recycling process can simply examine the indicator to determine if a data block is required to be moved. FIG. 3C shows the results of a recycling process as described above after the garbage collection process has completed.

Figure 4:
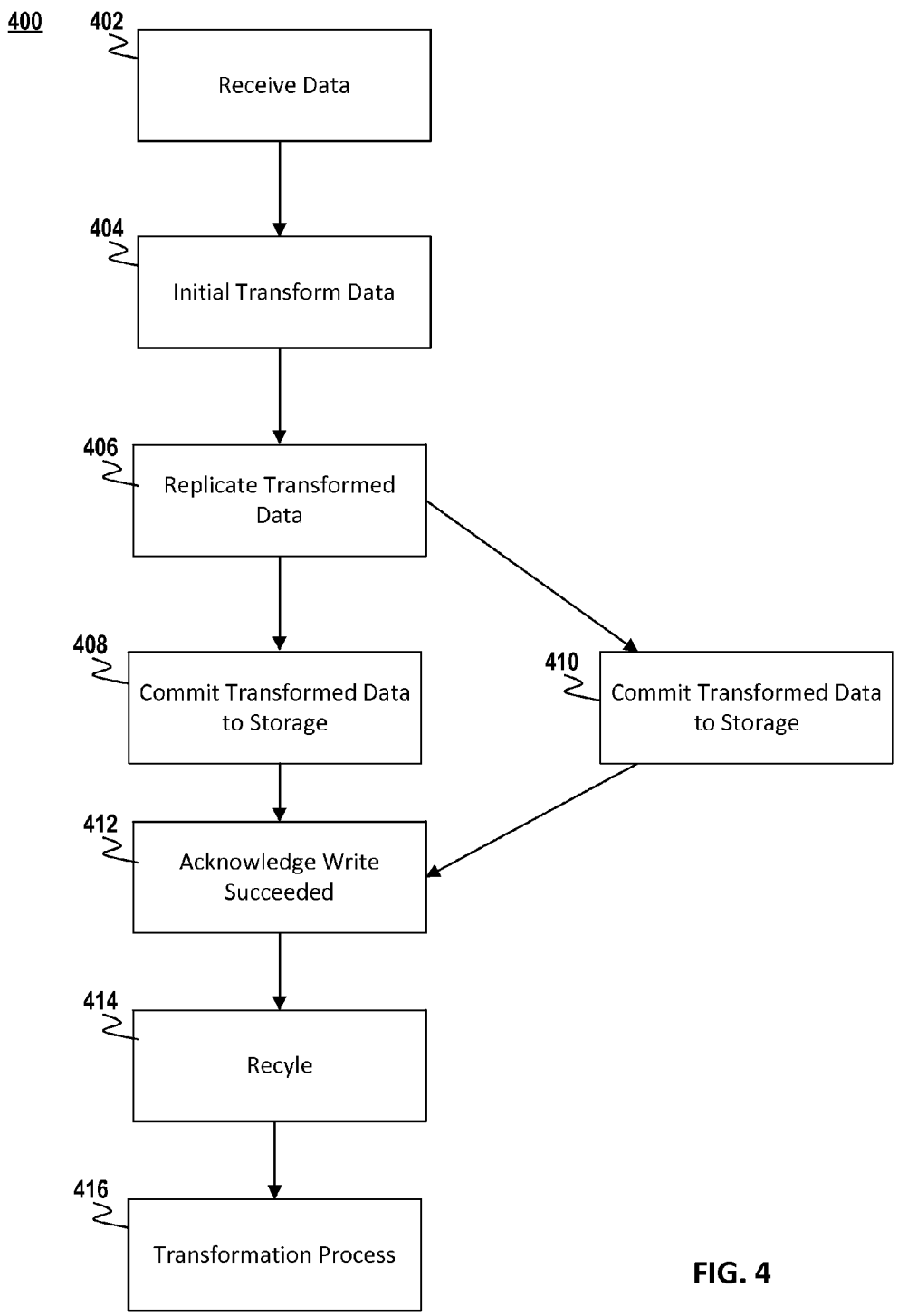
FIG. 4 illustrates a write I/O request in accordance with various implementations.

FIG. 4 illustrates a write I/O request in accordance with various implementations. A write request is received from an end user to write data (402). The data can be divided into multiple data blocks. For simplicity, a single data block write is described. An identifier associated with the data block is determined. For example, a hash of the data block can be used as its identifier. The data block can then be transformed (404). This transformation is an optional step or can involve multiple transformations. The data is then stored. Once stored, the write is acknowledged to the end user as complete. In some implementations, the data can be replicated to one or more separate storage devices (406). In these implementations, the data block is sent to the one or more storage devices and stored (408 and 410). A confirmation of the write is sent to either a primary storage device or a controller that is managing the storing of the data. Once each storage device has acknowledged that the data has been successfully written and/or committed to memory, the end user is notified that the write I/O request was successful (412). As the acknowledgement of the write I/O request is based upon all of these operations completing, the time between receiving the I/O request and the acknowledgement is directly proportional to how long these operations take to complete. Any reduction in the time for these operations to complete translates into quicker acknowledgment times.

After the data has been committed, various other file system operations can operate on this data in an asynchronous fashion compared to the end user's use of the data. In other words, the stored data can be manipulated independently of the end user's use of the file system. Recycling, garbage collection, and transformation are all examples of operations that can occur asynchronously (414). For example, as part of recycling, each data block that is written back to the file system can be transformed prior to being written back (416). These transformations are efficient in regard to I/O operations as during recycling reading and writing I/O operations are already being performed. Thus, any transformation done to data does not require additional I/O operations.

Figure 5:
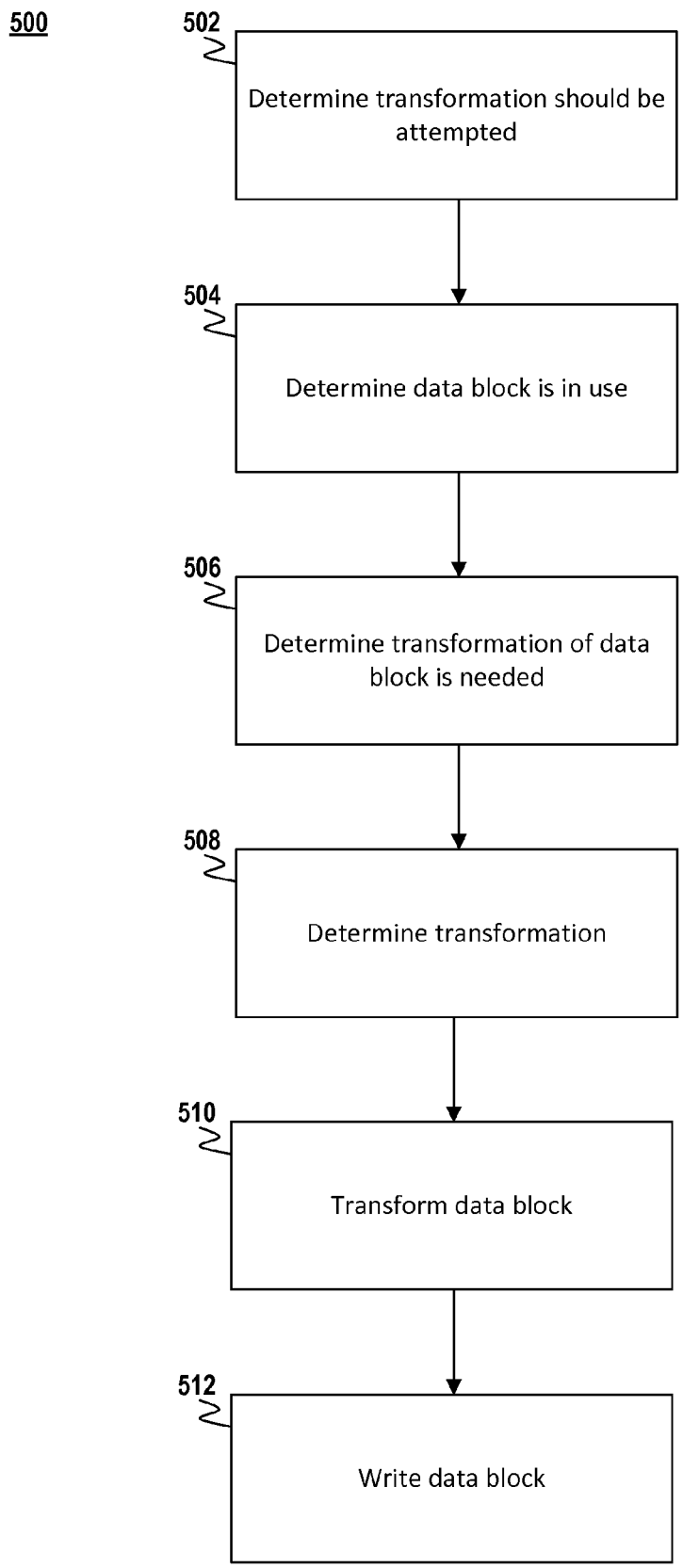
FIG. 5 illustrates a flow diagram of a transformation process in accordance with various implementations.

FIG. 5 illustrates a flow diagram of a transformation process in accordance with various implementations. The transformation process 500 can be integrated with the recycling processes described above. The process 500 can be implemented on a computing device. In one implementation, the process 500 is encoded on a computer-readable medium that contains instructions that, when executed by a computing device, cause the computing device to perform operations of process 500.

During recycling, transformation of in-use blocks can be accomplished. While transformation does not require additional I/O requests when done in combination with recycling, transformation does require the use of additional computing resources. For example, transformations can utilize the CPU, memory, and/or other storage system components. In some implementations, transformations will not be attempted based upon resources of the storage system. For example, if the CPU usage, memory usage, a combination of the two, etc., of a system where recycling is being performed is below a threshold, transformations will be performed. Otherwise, transformations will not be attempted during the current recycling process. Future recycling processes, however, can attempt transformations if the CPU usage is below the predetermined threshold. As another example, incoming write requests can be measured. If the number of write requests is high, indicating that throughput demand is high, transformations can be skipped. Accordingly, storage system resources can be analyzed to determine if transformations will be attempted. Thus, the storage system can determine if transformations will be attempted (502).

During recycling, data blocks are examined and it is determined if the data block is still being used by one or more end users (504). Whether a particular data block is in use can be determined as described above in regard to recycling and/or garbage collection. If a block is in use, the storage system next determines if a transformation of the data should be attempted (506). Similarly to the entire transformation process, system resources can be used to determine if a transformation should be attempted. Metadata associated with the data block can also be used. For example, if transformation consists of a single recompression algorithm, a bit indicating that recompression has previously happened can be used. In this implementation, only data blocks that have not already had recompression attempted will be transformed. As another example, the transformation can consist of a single compression or encryption algorithm. Once the data is compressed and/or encrypted, the metadata can be updated to indicate that compression and/or encryption has previously been done. Once a transformation is to be done, the type of transformation is determined (508). For example, a particular compression algorithm can be selected based upon previously attempted compression algorithms. The selected transformation can then be used to transform the data of the data block (510). The results of the transformation can then be analyzed. For example, if a data block is recompressed, the size of the recompressed data block can be compared to the size of the original data block. Only if the recompressed data block is smaller in size is the transformed data block written to storage. Finally, the transformed data block can then be written to storage as part of the recycling process (512).

As described above, transformation of data can occur during the recycling process. In these implementations, transformation is done without requiring any additional I/O requests. There are various transformations that can occur.

Compression is one example of a transformation. In various implementations, data is written to the storage system without any file system level compression. During recycling, the data can be compressed prior to being written back to disk. A flag can be used to indicate that the data is compressed such that no further compression is attempted on the data block during future recycling processes.

A storage system can dynamically monitor resources and update parameters of the storage system. For example, if the write times are above a predetermined threshold, compression of the data during the initial write can be turned off. Once write times drop below another threshold for a period of time, the initial compression can be turned back on.

Different compression algorithms can also be used. For example, two or more different compression algorithms can be used to attempt to compress a data block. In one implementation each compression algorithm can be used during a single recycling process to determine the best compression method based upon the smallest compressed size of the data block. Metadata indicating which compression algorithm is used can be stored and associated with the data block. This metadata can be used during a read operation to uncompress the data.

In another implementation, each data block is attempted to be compressed using two or more different compression algorithms. During the recycling process, metadata associated with a data block can be used to determine what compression algorithm should be attempted next. If all of the compression algorithms have been tried, no further compression transformations are attempted. In another implementation, metadata that identifies the type of data stored is used to select a compression algorithm. For example, if the metadata indicates that the data stored is associated with a text file, .html file, non-binary content, etc., a compression algorithm that is both efficient and effective in compressing the data type is selected and used. In another implementation, the metadata can indicate how much the current data is compressed. If the compression of the data is less than a predetermined threshold, e.g., 50%, recompression can be attempted. Otherwise, the data block can be ignored in regard to transformation. In addition, the usage of the data type and the level of compression can be used together. For example, binary data that is compressed by more than 5% can be considered adequate to avoid trying other compression algorithms, while text data that is compressed by more than 75% can be considered adequate to skip attempting recompression.

The storage system can also do an initial compression of data as part of the initial write of the data to the storage system. Then during recycling, additional compression algorithms can be attempted as described above.

Transformation is not limited to compression. As another example, decompression can be a transformation. The storage system can monitor its historical usage. For example, the storage system can monitor the average CPU load, read latency, etc. If the read latency, CPU usage, and/or other system statistic indicate that data reads are taking too long, e.g., the read latency is above a predetermined threshold, data can be decompressed. For example, during recycling data can be decompressed completely to alleviate the slowdown. Alternatively, the data can be decompressed and recompressed with a compression algorithm whose decompression is less resource intensive. Accordingly, after the recycling process completes some or all of the stored data can be read faster based upon the data being decompressed or compressed with an algorithm whose decompression is less resource intensive. As noted above, this transformation can be done during recycling without the cost of any additional I/O requests.

Another example of transformation is encryption. Data can initially be stored either unencrypted or with a fast, but less robust encryption algorithm. During recycling, the data can be decrypted and reencrypted using a more robust encryption algorithm. In another implementation, data can be decrypted and reencrypted using new security parameters. For example, a new private key can be used to encrypt data. This allows a security system to change its private and/or public/private key pair without requiring that all data be decrypted and reencrypted at once.

Similar to decompression, decryption can also be a transformation. For example, if data is encrypted using an encryption algorithm, the data can be changed to decrypted data. In various implementations, system level parameters can be used to determine if data should be decrypted. For example, if write times are above a predetermined threshold and the CPU usage of the system is high, data can be decrypted. Reading unencrypted data is faster than encrypted data, as the data does not need to be decrypted prior to returning the data. As another example, a user may determine that the system should no longer use encryption and turn the encryption feature off. Rather than decrypting the entire storage at once, a decryption transformation can be used to eliminate the use of encryption.

Encoding data is another example of a transformation. For example, data can be encoded into a different coding. In one implementation, videos encoded in one format can be changed into another format. Another example is an image encoded in one format that can be changed to another format as part of the recycling process.

Multiple transformations can be accomplished at the same time. For example, initially data can be written to disk without any compression or encryption. During a single recycling process, the data can be both compressed and encrypted as described above. Storage system usage parameters can be used to determine if multiple transformations can occur during a single recycling process. For example, if the storage system is being underutilized multiple transformations can be done. Conversely, if the storage system is being moderately utilized, a single transformation can be attempted, with a second transformation being done during a future recycling process.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of "operably couplable" include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A storage system comprising:
one or more electronic processors configured to:
receive a request from one user of the storage system to store data in the storage system, wherein the request comprises data, and wherein the data comprises a data block;
determine if an initial compression should occur due to parameters of the storage system;
write the data block to the storage system prior to a recycle operation;
determine that transformations of data of the storage system should be attempted;
determine the data block is in use by at least one user of the storage system;
determine a transformation of the data block should be done based upon the determination that the data block is in use by at least one user of the storage system;
determine a transformation to be done to the data block based upon the determination that the transformation of the data block should be done;
transform the data block based upon the determined transformation;
write the transformed data block to the storage system; and
recycle, as part of the recycle operation, a portion of storage space to free up space available for data writing, wherein the transformation is integrated into the recycle operation, wherein the transformation requires no additional input/output requests from the recycle operation, and wherein the write the transformed data block to the storage system is part of the recycle operation.

2. The storage system of claim 1, wherein the storage system uses a log-structured file system.

3. The storage system of claim 1, wherein the one or more electronic processors are further configured to:
compress the data block using a first compression algorithm based upon the determination that the initial compression should occur, wherein the compressed data block is the data bock written to the storage system prior to the recycle operation.

4. The storage system of claim 3, wherein the determined transformation is compression using a second, different compression algorithm, and wherein to transform the data block the one or more electronic processors are configured to:
uncompress the data block using the first compression algorithm; and
compress the data block using the second compression algorithm.

5. The storage system of claim 4, wherein to transform the data block the one or more electronic processors are configured to:
compare the size of the compressed data block using the second compression algorithm with the size of the compressed data block using the first compression algorithm; and determine the smallest compressed data block based upon the comparison, wherein the smallest compressed data block is written to the storage system as part of the recycling.

6. The storage system of claim 3, wherein the one or more electronic processors are further configured to:
determine that a usage level of storage system resources for decompression of data is above a predetermined threshold;
wherein to determine a transformation to be done to the data block, the one or more electronic processors are configured to:
determine a compression algorithm used to compress the data block; and
determine a second compression algorithm that requires less resources than the compression algorithm used to compress the data block;
decompress the data block using the compression algorithm used to compress the data block; and
compress the data block using the second compression algorithm.

7. The storage system of claim 3, wherein the one or more electronic processors are further configured to:
determine that a usage level of storage system resources for decompression of data is above a predetermined threshold, wherein the determined transformation is uncompression;
wherein to transform the data block the one or more electronic processors are configured to decompress the data block using a compression algorithm used to compress the data block, wherein the decompressed data block is written to the storage system as part of the recycling.

8. The storage system of claim 1,
wherein the data block written to the storage system prior to the recycle operation is uncompressed.

9. The storage system of claim 8, wherein the determined transformation is compression using a compression algorithm, and wherein to transform the data block the one or more electronic processors are configured to compress the data block using the compression algorithm.

10. The storage system of claim 1, wherein the one or more electronic processors are further configured to:
encrypt the data block using a first encryption key prior to the write of the data block to storage, wherein the determined transformation is re-encryption;
decrypt the data block; and
encrypt the data block using a second, different, encryption key.

11. The storage system of claim 1, wherein the one or more electronic processors are further configured to:
encrypt the data block using a first encryption algorithm;
write the data block to the storage system prior to the recycle operation;
wherein to determine a transformation to be done to the data block, the one or more electronic processors are configured to:
decrypt the data block based upon the first encryption algorithm.

12. The storage system of claim 1, wherein the one or more electronic processors are further configured to:
determine a second transformation to be done to the data block;
transform the transformed data block based upon the second transformation before the transformed data block is written to the storage system.

13. A method comprising:
receiving a request from one user of the storage system to store data in the storage system, wherein the request comprises data, and wherein the data comprises a data block;
determining if an initial compression should occur due to parameters of the storage system;
write the data block to the storage system prior to a recycle operation
determining, using one or more electronic processors, that transformations of data of the storage system should be attempted;
determining, using the one or more electronic processors, the data block is in use by at least one user of the storage system;
determining, using the one or more electronic processors, that a transformation of the data block should be done based upon the determination that the data block is in use by at least one user of the storage system;
determining, using the one or more electronic processors, a transformation to be done to the data block based upon the determination that the transformation of the data block should be done;
transforming, using the one or more electronic processors, the data block based upon the determined transformation;
writing, using the one or more electronic processors, the transformed data block to the storage system; and
recycling, as part of the recycle operation, a portion of storage space to free up space available for data writing, wherein the transformation is integrated into the recycle operation, wherein the transformation requires no additional input/output requests from the recycle operation, and wherein the write the transformed data block to the storage system is part of the recycle operation.

14. The method of claim 13, wherein the storage system uses a log-structured file system.

15. The method of claim 13, further comprising:
compressing the data block using a first compression algorithm based upon the determination that the initial compression should occur, wherein the compressed data block is the data bock written to the storage system prior to the recycle operation.

16. The method of claim 15, wherein the determined transformation is compression using a second, different compression algorithm, and wherein transforming the data block comprises:
uncompressing the data block using the first compression algorithm; and
compressing the data block using the second compression algorithm.

17. The method of claim 16, wherein the transforming the data block comprises:
comparing the size of the compressed data block using the second compression algorithm with the size of the compressed data block using the first compression algorithm; and
determining the smallest compressed data block based upon the comparison, wherein the smallest compressed data block is written to the storage system as part of the recycling.

18. The method of claim 13, wherein writing the data block to the storage system prior to the recycle operation comprises writing the data block as uncompressed data.

19. A non-transitory computer-readable medium having instructions stored thereon, the instructions comprising:
- instructions to receive a request from one user of the storage system to store data in the storage system, wherein the request comprises data, and wherein the data comprises a data block;
- instructions to determine if an initial compression should occur due to parameters of the storage system;
- instructions write the data block to the storage system prior to a recycle operation;
- instructions to determine that transformations of data should be attempted;
- instructions to determine that a data block is in use by at least one user of the storage system;
- instructions to determine that a transformation of the data block should be done based upon the determination that the data block is in use by at least one user of the storage system;
- instructions to determine a transformation to be done to the data block based upon the determination that the transformation of the data block should be done;
- instructions to transform the data block based upon the determined transformation;
- instructions to write the transformed data block to the storage system; and
- instructions to recycle, as part of the recycle operation, a portion of storage space to free up space available for data writing, wherein the transformation is integrated into the recycle operation, wherein the transformation requires no additional input/output requests from the recycle operation, and wherein the write the transformed data block to the storage system is part of the recycle operation.

20. The non-transitory computer-readable medium of claim 19, wherein the storage system uses a log-structured file system.

* * * * *